UNITED STATES PATENT OFFICE.

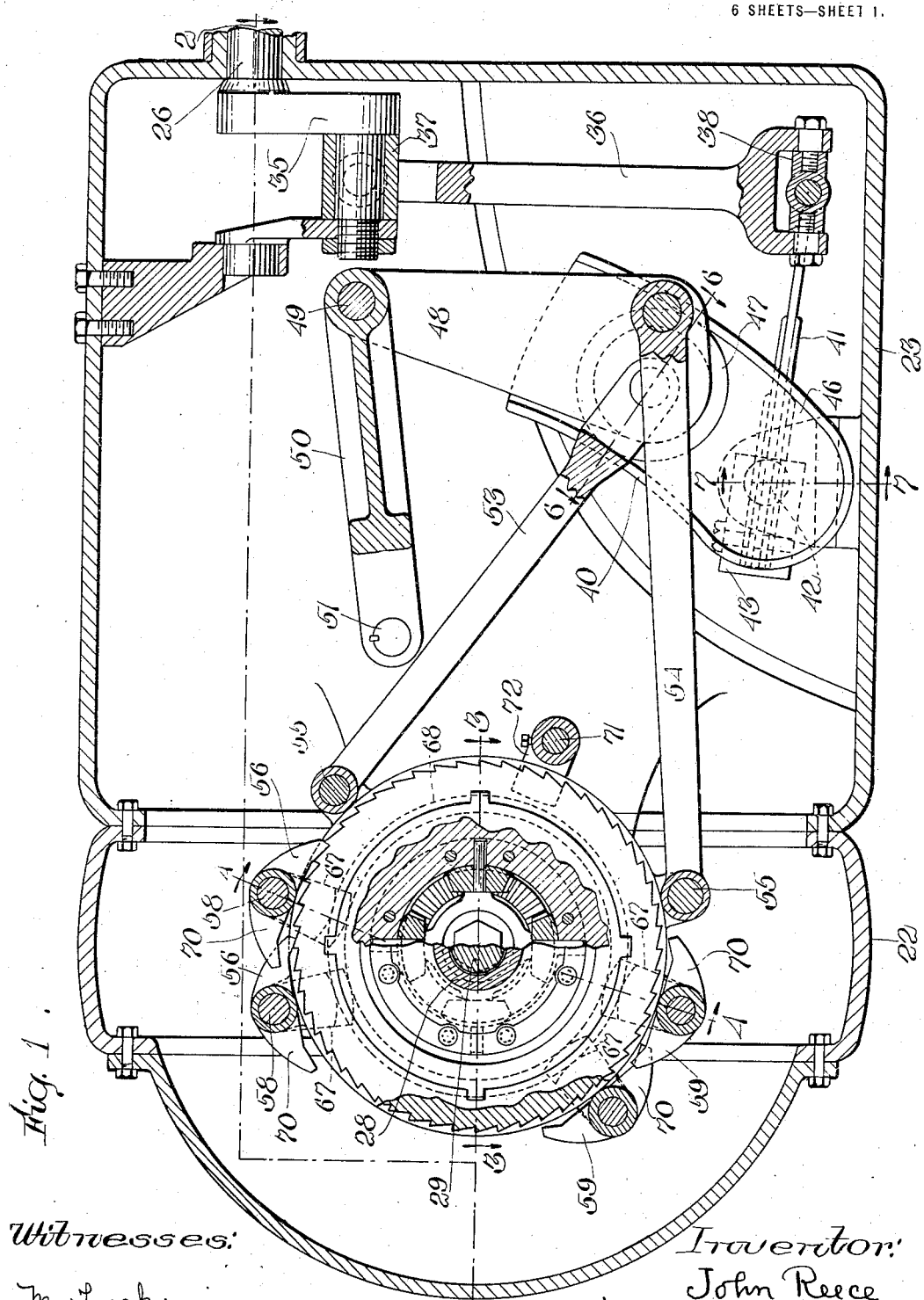

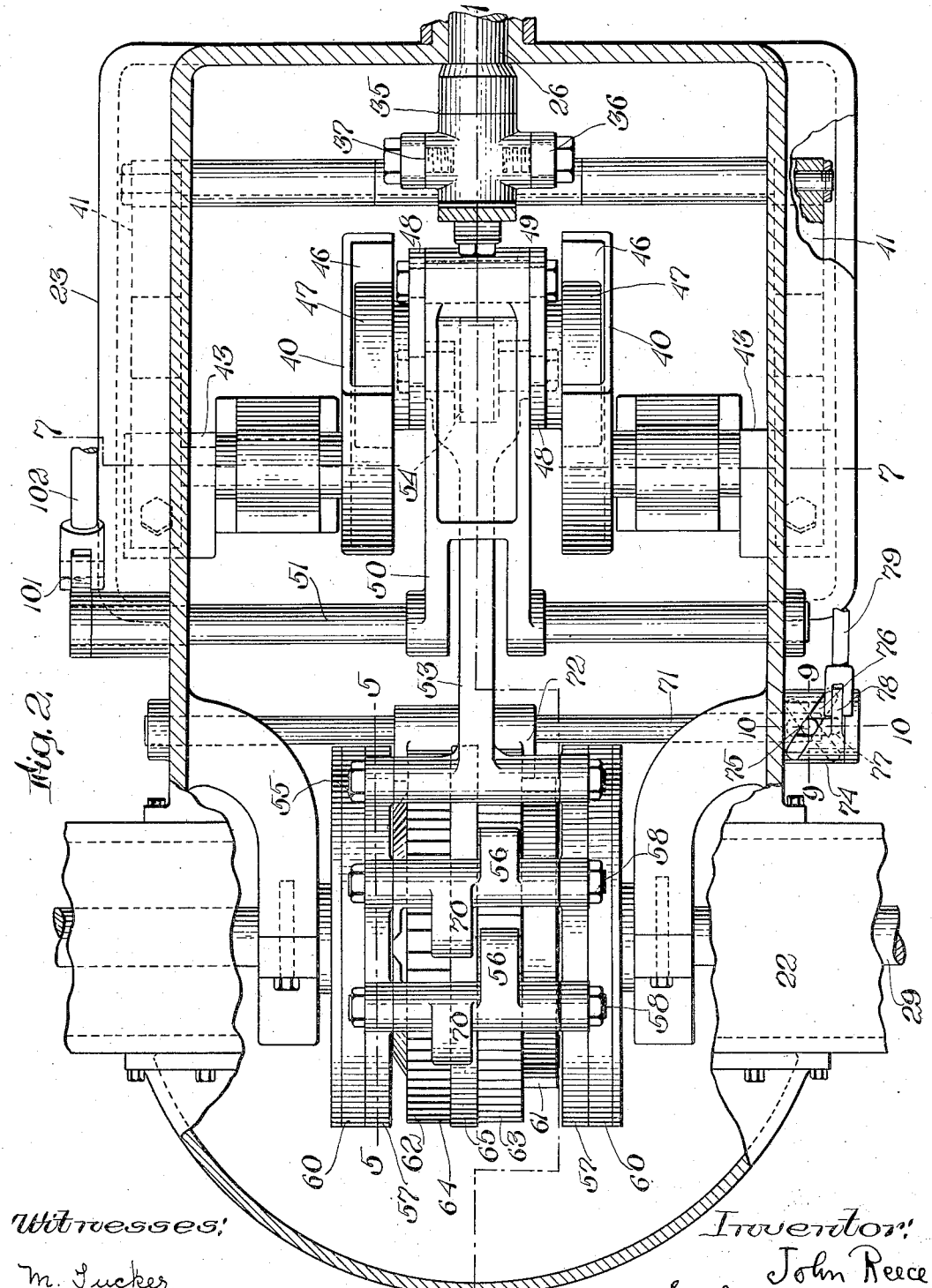

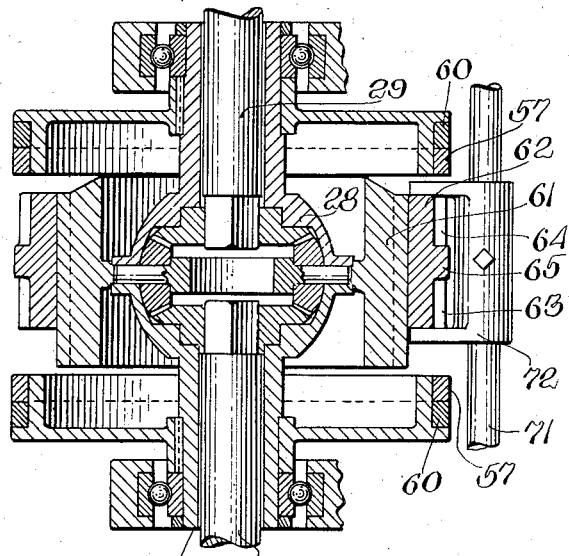
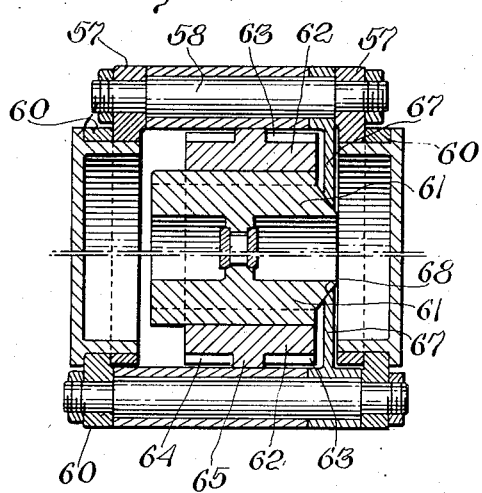
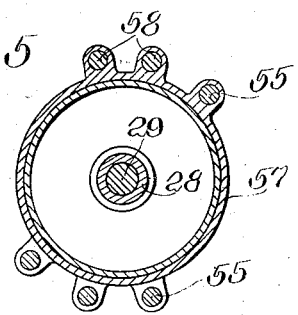
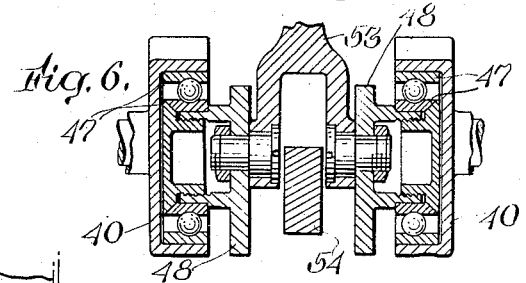
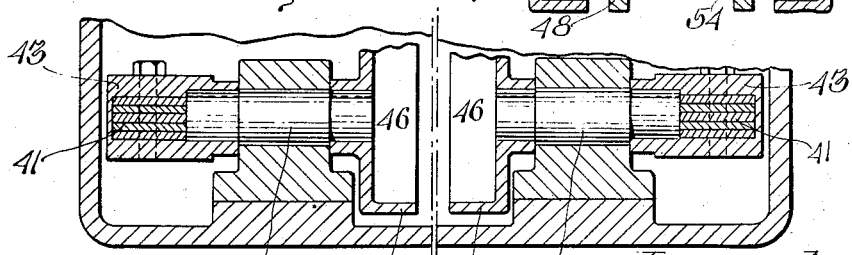

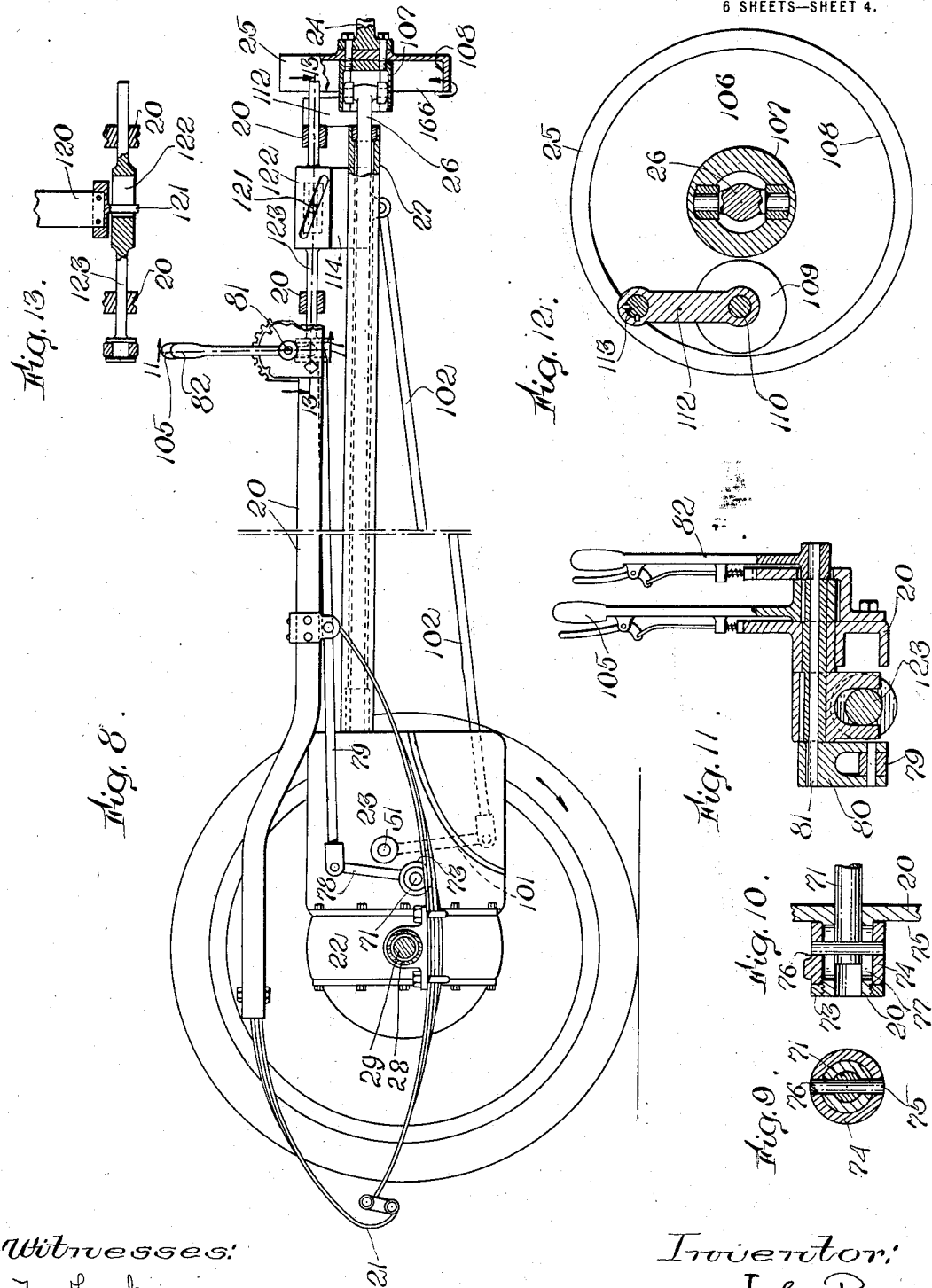

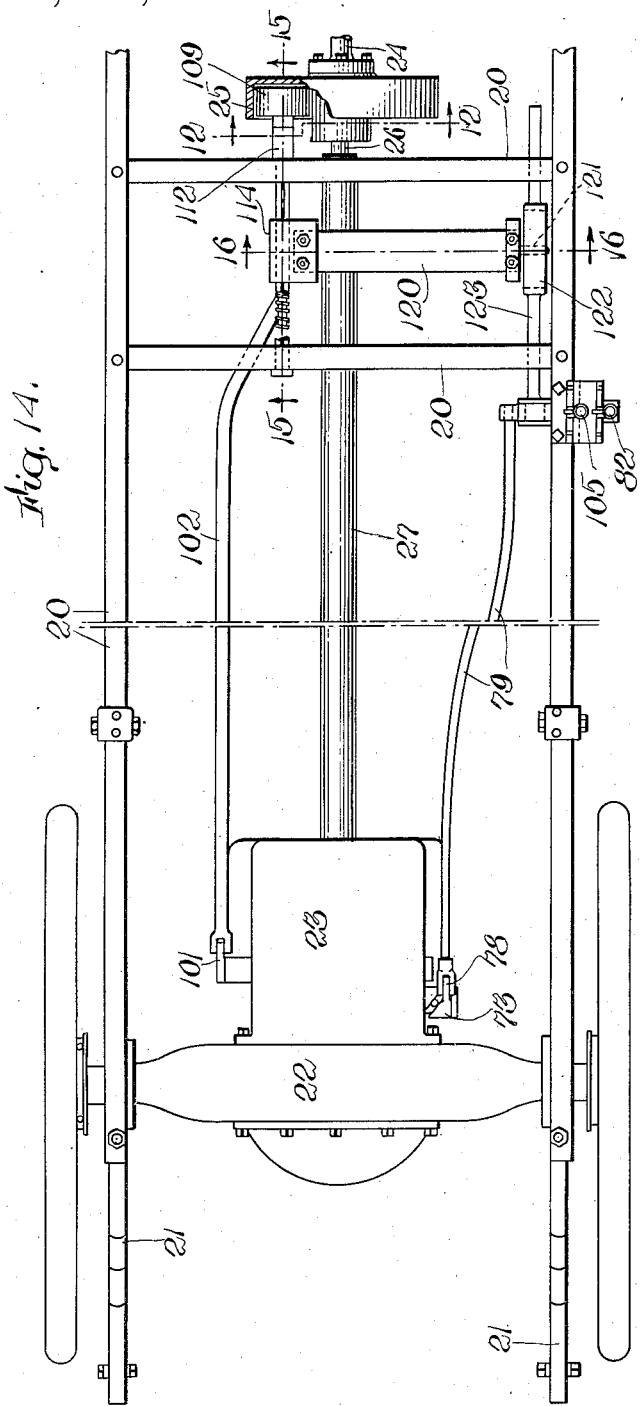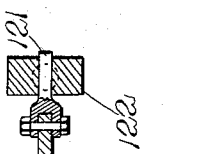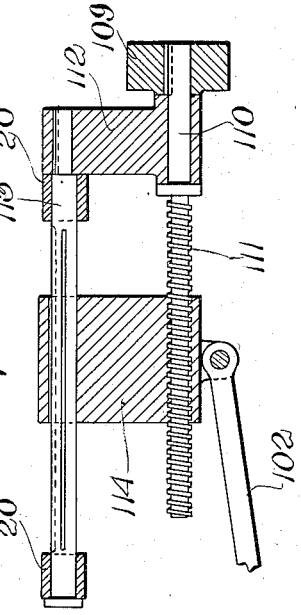

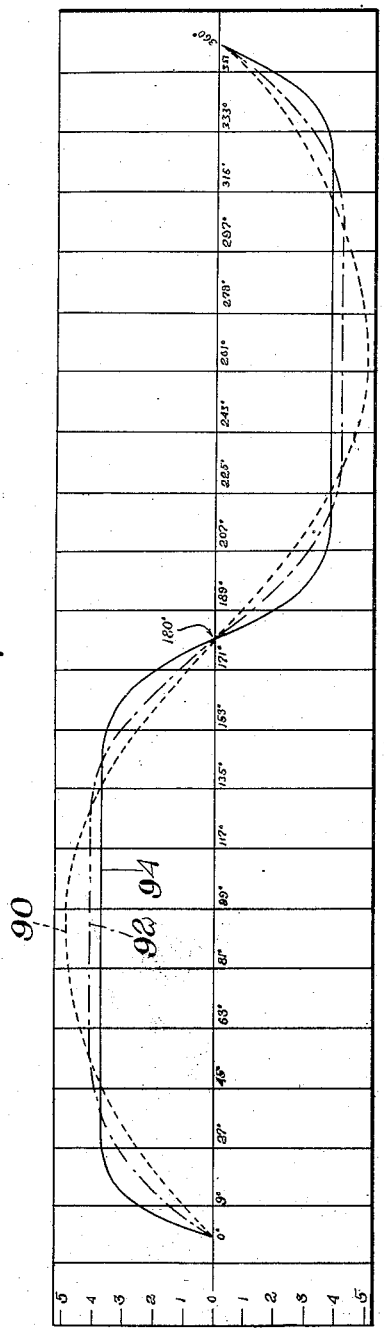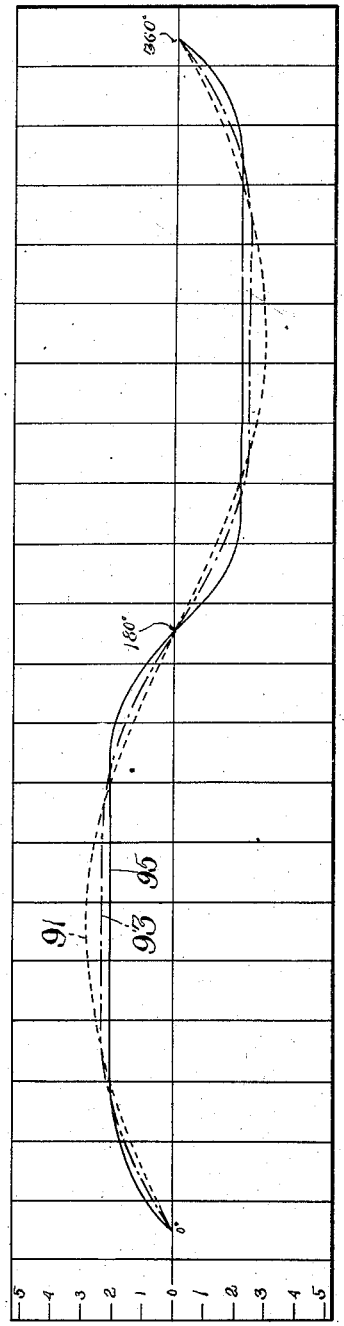

JOHN REECE, OF MANCHESTER, MASSACHUSETTS.

VARIABLE-SPEED TRANSMITTER.

1,153,256.  Specification of Letters Patent.  Patented Sept. 14, 1915.

Application filed October 29, 1914. Serial No. 869,173.

*To all whom it may concern:*

Be it known that I, JOHN REECE, a citizen of the United States, residing at Manchester, in the county of Essex and State of Massachusetts, have invented certain new and useful Improvements in Variable-Speed Transmitters, of which the following is a specification, reference being had therein to the accompanying drawing.

This invention relates to variable speed transmitters, and more particularly to mechanism for transmitting the motion of a rotary driving shaft to a rotary driven shaft with provision for varying the speed ratio. The two shafts may, for example, be respectively connected to the engine and to the wheels of a motor vehicle, the mechanism hereof permitting the speed of the vehicle to be controlled.

Generally the object hereof is to afford an improved and simplified variable speed transmitting mechanism possessing good efficiency of transmission, easily adjustable for varying speed ratios, capable of giving any desired ratio between the extreme limits of adjustment, capable of reversing the driven shaft and free from the structural weaknesses and other objections of heretofore known mechanisms.

A particular object hereof is to permit the practical use of an intermittent gripper device for actuating the driven shaft by the provision of a practical and efficient link motion or other mechanism between the eccentric or crank on the driving shaft and the gripper of the driven shaft, which is able to impart substantially uniform speed of travel to the gripper during its operative stroke, thus harmonizing the gripper action with the natural tendency of the driven parts to uniform speed.

Another object is to provide such a gripper actuating mechanism which maintains the speed uniformity of the gripper throughout the adjustment of the mechanism for varying the speed ratio of the shafts.

Another object is to provide a resilient means or element in the train of connected mechanism in such location and of such character as to eliminate the objection to previous constructions.

Another object is to provide a novel and effective device for controlling the operative or inoperative adjustment of the grippers or pawls.

Another object is to secure in a simplified manner the means of reversing the action of the grippers, so as to reverse the driven shaft at will.

Another object is to give a certain automatic speed adjustment in accordance with the actual road conditions encountered by the motor vehicle.

Another object is to enable with greater certainty and ease than heretofore the actual adjustment of the power transmitting parts between the different positions corresponding with the various speeds of the apparatus.

Further objects will be elucidated in the hereinafter following description.

To the attainment of the above referred to objects the present invention consists in the novel combinations, mechanisms, devices, arrangements and details hereafter referred to or illustrated in the accompanying drawings, which show one embodiment of the present invention.

In the accompanying drawings forming a part hereof, Figure 1 may be considered as a partial side elevation and a partial vertical section of a variable speed transmitter embodying the present invention, the section being taken on the plane 1—1 of Fig. 2. Fig. 2 is a plan view of the parts shown in Fig. 1, partly taken on the plane 2—2 of Fig. 1. Fig. 3 is a horizontal section taken on the plane 3—3 of Fig. 1. Fig. 4 is a section on the plane 4—4 of Fig. 1. Fig. 5 is a vertical section on the plane 5—5 of Fig. 2. Fig. 6 is a section on the plane 6—6 of Fig. 1. Fig. 7 is a vertical section on the plane 7—7 of Figs. 1 and 2. Fig. 8 is a side elevation of portions of a motor vehicle to which the present invention is applied. Fig. 9 is a vertical section on the plane 9—9 of Fig. 2. Fig. 10 is a vertical section on the plane 10—10 of Fig. 2. Fig. 11 is a vertical section on the plane 11—11 of Fig. 8. Fig. 12 is a vertical section on the plane 12—12 of Fig. 14. Fig. 13 is a horizontal section on the plane 13—13 of Fig. 8. Fig. 14 is a plan view of the parts shown in Fig. 8. Fig. 15 is a vertical section on the plane 15—15 of Fig. 14. Fig. 16 is a vertical section on the plane 16—16 of Fig. 14. Fig. 17 is a diagram illustrating the operation of the invention. Fig. 18 is a similar diagram illustrating the operation when the parts are adjusted for a lower speed ratio.

The present invention operates through an eccentric actuated by the driving shaft and an intermittently acting gripper coöperating with the driven shaft for rotating it, with mechanism between the shafts by which the eccentric vibrates the gripper. Eccentric in this connection includes any eccentric shaft device such as a crank, while a gripper indicates any device adapted to intermittently operatively engage with and disengage from the driven shaft or a drum on the driven shaft, such as a pawl engaging a toothed drum or ratchet, which pawl may be fitted in any suitable manner for vibration near the driven shaft or ratchet. The speed of the driving shaft may be assumed to be constant and of a high rate, for example seven hundred revolutions per minute in a motor vehicle. With transmitting devices of the present type, when the driving shaft speed is constant, the intermittent gripper may have its speed altered to change the speed ratio of the shafts by proportionately altering its extent of travel.

The present invention affords a mechanism adapted to practically carry out these operations and adjustments, and by a mechanism which is not only simple, but preserves efficiency through the low weight of the parts and possesses durability and freedom from excessive wear.

In heretofore known transmitting mechanisms of the intermittent gripper type there has been no effective driving action of the gripper because of the inability to secure a constant angular velocity of gripper movement during its driving stroke, this being due to the natural effect of introducing an eccentric, the latter causing a speed variation from zero to maximum and back to zero in a well known manner. If the effect of the crank motion were to be represented graphically, the speed curve would take a form similar to that shown at 90, Fig. 17 or 91, Fig. 18. Two things are obvious, first, that with a gripper motion represented by the curve 90 the maximum velocity is in effect only instantaneously, and, second, that, due to the momentum of the driven parts, the gripper may drive only when moving at its maximum velocity, that is, when its speed is as great as that of the driven shaft. Therefore, there being no substantial period of driving action, the efficiency of transmission is extremely poor and the strain on the parts is immense, as all the driving action is concentrated in the short extent of maximum gripper velocity. Moreover, the driving would be extremely unsteady. These defects would be largely overcome and the driving rendered more steady by the employment of a suitable number of grippers operating in close succession and each acting only at its maximum velocity; but such a mechanism would be impractical because of the prohibitive weight of employing a number of eccentrics and gripper mechanisms. Two, or at most four, grippers is deemed to be the limit.

The problem, therefore, to which this invention is directed is to secure with the minimum number of grippers a maximum percentage of uniform gripper speed and driving action; in other words, to reconstruct the gripper action so as to uniformly prolong the maximum or driving speed of each gripper. The gripper action represented by the curves 92 of the diagram, Fig. 17, or 93, Fig. 18, possess an approximately uniform maximum driving speed over a very substantial portion or fraction of the total stroke of the gripper; and the curves 94 and 95 possess these qualities in a further degree. The mechanism of this invention is adapted to secure for each gripper the action represented by the curves 92 and 94 or 93 and 95 of the diagram.

Bearing in mind the above explanations, the following description of the first portion of this invention will be understood. This involves the feature of mechanism by which the eccentric on the driving shaft vibrates the gripper which moves the driven shaft, and the inclusion in such mechanism of means for rendering uniform or approximately uniform the gripper speed through a substantial part of its travel. In the illustrated embodiment this comprises an oscillating lever intermediate the eccentric and the gripper with which coöperates a device for changing the effective radius of the lever as the parts oscillate.

Some of the general machine parts will first be referred to. While the link-and-lever mechanism is best illustrated in Figs. 1, 2, etc., the manner of application thereof to a motor vehicle is generally illustrated in Figs. 8, 14, etc. Connected with the usual vehicle frame 20 are the elliptical spring suspensions 21 by which the frame is supported from the rear axle housing 22. The transmission housing 23 is located forward of the axle housing. The usual engine shaft 24 is provided with fly-wheel 25, and by a universal joint this drives the propeller shaft 26 extending rearwardly to the transmisison housing. For well-known purposes the shaft 26 is surrounded by a torque tube 27. A bearing sleeve 28 surrounds the rear axle 29, which is provided with the usual differential gears as shown. It will be noted that the transmisison housing, instead of being mounted upon the frame, is rigidly connected with the rear axle housing.

Referring now to Figs. 1 and 2, the rear end of the propeller shaft 26 is shown as provided with an eccentric 35. The eccentric is connected to the rod 36 by a universal joint 37, and a second universal joint 38 connects the extremity of the rod 36 with a bell crank lever 40, 41, which is pivoted at 42. The two arms 40 and 41 of the bell crank lever each have a peculiar construction to be more fully described. It is the arm 41 which is universally jointed to the rod 36, and it is shown composed of leaf springs assembled in the manner indicated and firmly secured together by clamp 43, forming part of the bell crank lever.

The parts thus far described serve, upon rotation of the driving shaft 26, to effect to-and-fro swinging of the arm 40, which, as will shortly appear, is adapted to transmit the vibratory motion to one or more grippers coöperating with the driven shaft.

Reference to Fig. 2 will show that, instead of a single bell crank arm 40, there is an opposed pair of them for giving better symmetry and stability to the mechanism. Each of the arms 40 is recessed at 46 on its inner side, so as to form a track for a roller 47, the track having a somewhat curved form, which is concave on the side nearest to the gripper.

The roller 47 and its carrying arm 48, pivoted at 49, constitute a device for changing the effective radius of the lever 40 as the parts oscillate. The pivot 49, while stationary during the normal running of the machine, is capable of having its position adjusted by the swinging of an adjusting lever 50 for altering the speed ratio of the mechanism in a manner which will be later specifically described. The lever 50 is forked to accommodate the rod 53.

A connecting rod 53 extends from the roller 47 or its supporting arm 48 to the gripper or grippers located above the driven shaft, while a similar connecting rod 54 extends to the grippers below the shaft. The extremity of each of the connecting rods, 53, 54, is provided with a fulcrum shaft 55 arranged crosswise, so as to permit the symmetrical operation of an opposed pair of gripper supporting rings.

Instead of employing grippers of a type which frictionally engage the driven shaft or a drum thereon, a true mechanical engagement is preferred such as is afforded by a pawl and ratchet, and, instead of a single pawl, it is preferred to employ pawls in pairs so as to minimize lost motion in the act of engaging the pawls with the ratchet teeth on the driving stroke thereof. Thus, there are a pair of pawls 56, 56 at the upper side which have their support from a double supporting ring 57 through crosswise arranged fulcrum shafts 58, 58. Similarly the lower pair of pawls 59, 59 are supported from the double supporting ring 60.

It will be understood that the connecting rod 53 through its cross fulcrum shaft 55 engages the double rings 57, 57, so that the oscillation of the rod effects the vibration of the rings and of the upper pawls; while the lower connecting rod 54 is similarly connected to the double rings 60 for vibrating the under pawls.

The toothed drum or ratchet with which the pawls coöperate comprises (see Fig. 3) a hub portion 61 concentric with the driven shaft and rotatable therewith and the toothed sleeve 62, which is splined to the hub. The exterior of the sleeve 62 is formed in three parts or sections, namely, the toothed part 63, with which the pawls 56 and 59 coöperate for forward driving, and a toothed part 64 for reverse driving, and a middle section or part 65 for rendering the pawls inoperative. For reverse driving each of the pawls 56 has an opposed extension 70 coöperating with the ratchet section 64, and the lower pawls 59 are similarly formed.

Reviewing the mechanism thus far described, the arm 40 constitutes an intermediate oscillating lever actuated by the eccentric and serving to vibrate the pawl, and in connection with said lever is a device for changing its effective radius as the parts oscillate for the purpose of rendering approximately uniform the speed of the gripper through a substantial part of its travel. This device consists in the roller 47 and arm 48, which cause the end of connecting rod 53 to shift along the length of the lever 40, thus altering the effective lever length. As before stated, the eccentric 35 tends to give an instantaneous maximum speed substantially at mid-stroke, and in the diagram, Fig. 17, the curve 90 represents the motion that the pawl would have if there were no change of effective length of the lever 40. The action of the device 47, 48 is to reduce the effective length of the lever substantially in mid-stroke, because at that time the lever 40 and arm 48 are in alinement, whereas the effective length of the lever 40 is increased upon displacement to either side of mid-position. The purpose of the concave curvature of the lever is now apparent. It is substantially concentric with the driven shaft, so that adjustment of the roller 47 along the lever does not disturb the relative positions of the parts. The design and proportion of the illustrated parts is so calculated as to render uniform the speed of the pawl throughout a substantial part of its stroke, namely, about two-thirds of the stroke. The introduction of the device 47, 48 changes the speed curve of the pawl from that shown at 90 in Fig. 17 to that shown at 92. This, however, is on the assumption that the yielding character of the arm 41 is ignored, and, as will be later shown, the introduction of such yielding element in the manner shown serves to still further lengthen the effective driving stroke of the pawl and to give substantially the curve represented at 94 in the diagram.

The described uniform pawl velocity or action prevails not only for the illustrated speed adjustment, but for all speed adjustments. The diagram, Fig. 17, shows a comparatively higher and the diagram, Fig. 18, a comparatively lower speed ratio, and it will be seen that in each instance the maximum pawl velocity is rendered uniform over an extended or substantial part of its travel or active stroke. This maintenance of all speed uniformity for all adjustments will be understood by considering the relative arrangement of parts, as shown in Fig 1. The distance of the roller 47 from the pivot 42 of the arm 40 determines the speed ratio, and, since every oscillation of the arm 48 at any speed adjustment causes the roller 47 to approach the pivot 42 in midstroke or when the crank 35 is reaching its maximum throw, it is apparent that the action of rendering the pawl speed uniform results in all adjustments.

So far the invention has been described with reference to the particular speed adjustment illustrated in Fig. 1, but it is essential that the extent of travel of the pawl, and therefore the speed ratio, shall be adjustable without destroying its prolonged speed uniformity. This result is attained herein by the described construction, arrangement and proportions of the described parts, and through the mode of adjustment of the pivot 49, which, by the adjusting lever 50, may be swung one way or the other about the fulcrum shaft 51 of the lever. The relation of the fulcrum shaft 51 to the pivot 49, the lever 40 and the other parts is such that the circular adjustment of the pivot, while changing the position of the roller 47 in the lever 40 so as to alter the effective length and action of the lever, does so without altering the operation which is performed by the arm 48 of controlling the effective radius of the lever 40 as the parts oscillate. Thus, throughout the adjustment of speed ratio a pawl action is maintained having a diagram substantially like that designated 92 or 94 in Fig. 17 or 93 or 95 in Fig. 18.

It will be noticed that the axis about which the bell crank 40, 41 swings extends at right angles with the driving or propeller shaft. Owing to this the upward and the downward oscillations of the lever are identical, contrary to what would be the case if the axis and shaft were parallel.

Reference will now be made to the features and functions of the yielding element 41 combined with or forming part of the bell crank 40, 41. Assuming a constant speed of the driving shaft, the driven shaft has variable speeds. If as a yielding element an ordinary spring were introduced at any point in the system, for example, between the lever 40 and the pawl, such spring would have an extent of yield which would increase with the intensity of the force applied to the driven shaft, or, what is the same thing, with the decrease of travel of the pawl. This involves that the maximum yield of the spring occurs for the adjustment corresponding with the minimum travel of the pawl, and, if the amount of the yield is sufficiently large to be effective, it might easily offset the slight pawl travel with the result that there would be no driving action. This objection is herein overcome by a special structure and arrangement which, during the normal running of the machine, insures a uniform extent of yield of the yielding element for all speed ratios. The spring 41 herein is introduced in the train of mechanism at a special location. It serves not only the purpose which is referred to and also as a cushion for breaking the shock of applying power, but also under special circumstances where sudden and excessive strain might be imposed to prevent the same by an excessive extent of yield. For example, during any sudden increase of speed ratio and before the driven shaft has adjusted itself to the new ratio, the spring 41 will undergo more than its normal yield. In effect this is a temporary reduction of speed ratio pending the readjustment of operations. The presence of the spring element 41 serves to increase the driving efficiency. It does this by lengthening the effective driving stroke of the pawl. This is clear by comparing the curve 94 or 95 with the curve 92 or 93 in the diagrams, Figs. 17 and 18. This results from an earlier driving action, longer continued, as will be later more fully elucidated. As before stated, however, variations in ratio conditions will cause extensive and serious variations in spring yield, unless the spring be combined with the other mechanism as described herein. During normal operation, however, the yield of the spring 41 is uniform, so that the effective driving capacity of the system is not destroyed at low ratios. These advantageous results are attained by the illustrated structure involving the location of the spring 41 between the adjustable lever 40 and the driving crank or eccentric. The yield of the spring not taking place between the variable length arm 40 and the gripper is not susceptible to varying strains with ratio adjustments. Being, on the contrary, between the eccentric or crank 35 and the arm 40 the yielding element or arm 41 is affected only by the stresses between those parts. The speed of the driving shaft and the power delivered being assumed constant, the stress and therefore the strain on the yielding arm 41 is the same for every stroke. Ratio adjustments of arm 40 increase its leverage and decrease the length of working stroke, or vice versa, so that its work done on each throw of the eccentric is constant, and no effect is carried back to the yielding element, which therefore yields a certain small constant amount on every stroke. The mechanism between the pivot 42 and the pawl may possess the quality of rigidity; and for convenience the spring 41 is structurally combined with the intermediate lever 40, the two constituting a sort of yielding bell crank lever, with the yield between the rigid arm and the source of power.

The introduction of the yielding element serves to slightly decrease the maximum speed of the pawl, as the diagram shows. This results in a slightly earlier driving engagement of the pawl with the ratchet. The engagement commences the moment the increasing speed of the pawl equals the speed of the ratchet on the driven shaft, which point is represented by the shoulder on the curve 94. Therefore, the cushioning action is accompanied by the application of driving force, and toward the end of its active stroke, when the pawl slackens in speed, the energy stored in the compressed spring works usefully until the actual disengagement of pawl and ratchet.

In the illustrated structure there are shown two sets of pawls, one set operating on the forward stroke and the other on the return stroke of the lever 40 and the connecting rods. Therefore, the stroke of each pawl corresponds substantially with a 180° turn of the driving shaft, and the driving action of the pawl is somewhat less. It is found that with a structure such as illustrated, but without the use of the spring element 41, each pawl will do active work during about two-thirds of its stroke or 120° of driving shaft rotation. With the spring, as the diagram shows, the actual driving period is longer. Therefore, having the two sets of pawls, the total driving action continues during nearly the entire period of each rotation of the driving shaft, and thereby one of the main objects of the present invention is attained.

In automobile practice the driven shaft never makes more than one revolution to every two and one-half revolutions of the driving shaft, even on the highest speed ratio. Consequently, as there are two power strokes to each revolution of the driving shaft, on the highest speed ratio desirable, there would be at least five power strokes to each revolution of the driven shaft, and a greater number as the speed ratio was reduced. If there was no application of power during a turn of 20° of the driving shaft, the cessation of power as applied to the driven shaft would extend over only 8° at highest ratio, and proportionately less at other ratios, and such small amount may be considered negligible.

In order to control the driving pawls so as to eliminate the objectionable noise and wear which would be caused by their passing over the ratchet on their return stroke, the following simple and novel mechanism may be employed. The fulcrum shaft for each pawl may have a flat sector-shaped inwardly-extending member 67, (see Figs. 1 and 4), engaging frictionally with the hub 61 of the ratchet or other rotary part turning with the driven shaft. The member 67 is thin enough to have resilience and its inner extremity is beveled, as shown in Fig. 4, and through the resilience is caused to constantly press laterally against the similarly beveled hub portion or shoulder 68. With this arrangement, as will be clear from Fig. 1, each pawl is controlled so that it cannot engage the ratchet until its speed exceeds that of the ratchet. As soon as that condition is reached, the control extension 67 is thrown relatively back, thus tipping the forward end of the pawl into driving engagement with the ratchet. At all other times the rotation of the driven shaft maintains the pawl in disengaged position.

Each pawl 56 or 59 is shown as having a reverse extension 70 which comes into play as will be later described, for reversing the direction of drive. When the parts are adjusted for forward driving, the extension pawls 70 are maintained from engagement with the reverse ratchet section 64 by reason of the fact that the extensions lie over the smooth or inoperative section 65 of the ratchet sleeve, as seen in Fig. 2. When the adjustment is reversed, the pawl control extensions 67 control the position of the reverse extensions 70 of the pawls in a manner precisely similar to that above described.

Reference has been made to the reverse driving ratchet and the reverse driving pawls or extensions 70 coöperating therewith. The relation of these parts is best shown in Fig. 2. In that figure the forward driving pawls 56 are in operative relation to the forward ratchet 63, while the reverse pawls 70 are out of operative relation to the reverse ratchet 64, owing to their engagement with the central or smooth portion 65 of the ratchet sleeve. The mode by which the reverse adjustment is effected according to this invention is the axial sliding of the ratchet sleeve. Thus, if the sleeve be shifted bodily toward the observer in Fig. 2, it will be seen that the forward pawls are rendered inoperative and the reverse pawls are brought into operative relation with the ratchet. Such axial adjustment of the ratchet sleeve may be effected through a slide rod 71, which is provided with a yoke 72 (see Figs. 2 and 3) straddling the ratchet sleeve 62. By sliding the rod the ratchet is thus shifted. At one extremity of the rod 71 is a device 73 for effecting its sliding.

This device is shown in plan view in Fig. 2, and in section in Figs. 9 and 10. It comprises a revoluble sleeve 74 which coöperates with a cross pin 75 passing through the end of the rod 71. Between the revolving sleeve and the rod is a fixed sleeve marked 20 and forming a part of the frame of the machine. The fixed sleeve has a pair of opposite axial slots engaged by the pin 75. These permit the endwise movement of the rod, but prevent its rotation. The extremity of the fixed sleeve has a lock nut confining the revolving sleeve in position. The revolving sleeve at its opposite sides has a pair of inclined slots 76. The sleeve may be revolved by an extension arm 78 to thereby operate the inclined slots which act as cams to press the pin 75 inwardly or outwardly and thus shift the rod 79, reversing the drive. The extension arm 78 and the rod 79 extending therefrom are shown in exterior view in Fig. 8. The rod 79 passes from the arm 78 to a downwardly extending arm 80 (see Figs. 8 and 11) rigid upon a fulcrum shaft 81, to which is also rigidly connected the upwardly extending control handle 82, of usual form. Throwing the handle 82 forwardly or rearwardly operates through the described connections to shift the reversing rod 71 to right or left, so that the operator may easily change the mechanism from forward to reverse drive, or vice versa. Moreover, holding the handle 82 central causes the control portion 65 of the ratchet sleeve to hold all the pawls inoperative, thus disconnecting the drive.

Certain features and advantages of the described general arrangement of the driving mechanism will now be referred to. In a motor car it is important that neither the full play of the vehicle springs nor the swiveling motion of the rear axle shall interfere with or affect the drive. This is the case with the described arrangement. The weight of the transmission has been shifted from the vehicle frame to the rear axle housing, and the necessary swing or play of the axle and transmission with respect to the frame is provided for.

In a practical sense the ratio of the speed of the driven to that of the driving shaft should be as 1 to 3½, or at most as 1 to 2½. Heretofore reducing bevel gears have been employed to secure such ratio. With the present invention, however, the necessity of such gears is dispensed with as the described mechanism not only transmits, but naturally reduces the speed. With the present mechanism it is deemed that a speed ratio of 1 to 2 could be obtained, but, as before stated, such a high ratio is practically unnecessary. It will be noted that the present transmitting mechanism operates directly between the propeller shaft and the rear axle, or rather the surrounding sleeve which turns with the axle. Therefore, the propeller shaft is at the high speed end of the mechanism, and consequently it is not subject to the strains that would occur with a contrary arrangement. Therefore the employment of the present invention effects not only an increased efficiency, but a more simplified and durable construction.

The manner of control of speed adjustment has not yet been completely explained. It was shown that a circular adjustment of the fulcrum shaft 51 throws to a higher or lower position the pivot 49 of the arm 48, which controls the mean effective length of the lever 40 and which, during each oscillation, varies the effective length to render approximately uniform the driving speed of each pawl over a substantial part of its travel. The fulcrum shaft 51 is a cross shaft mounted in the frame, and at an exterior point it is provided with a downwardly extending arm 101 by which it may be swung through a connecting rod 102, extending forwardly to the control mechanism, which is now to be described.

Reference will now be had to Figs. 8 and 11 to 16. The control handle 105 governs the speed adjustment, and is located adjacent to the control handle 82, before mentioned. The revolution of the fly-wheel 25 is utilized for the purposes of adjusting the speed varying connections, under control of the handle 105. The fly-wheel has an angular groove 106 at its rear side affording an inner contact surface 107 and an outer contact surface 108 (see Fig. 12). Friction roller 109, faced with fiber, is adapted to engage one or the other of the surfaces 107, 108. The roller rotates about a shaft 110 (see also Figs. 15 and 16), which is capable of bodily swinging so as to shift the roller into contact with one surface or the other. The shaft 110 is extended into a threaded portion 111 for the purpose of adjusting the connecting rod 102 in a manner that will more fully appear. The shaft 110 is fulcrumed in a swinging block 112, which in turn is fulcrumed by a shaft 113 mounted in fixed frame parts or bearings marked 20. A slide block 114 guided for convenience along the shaft 113 has screw-threaded engagement with the threaded portion 111 of the shaft 110, and the connecting rod 102 is directly pivoted to said block. By this arrangement the rotation of the friction roller moves the block forward or rearward, thus shifting the connecting rod 102 and the parts connected therewith to increase or decrease the speed adjustment. Putting the roller into contact with the inner surface 107 will effect a speed increase by pulling forward the block 114 and rod 102, while contact with the outer surface 108 reduces the speed ratio. When the roller is out of contact with both surfaces, as shown in Fig. 12, the existing speed adjustment is retained, the screw 111 locking the block 114 against unintended movement.

The control of the roller 109 and associated parts is effected from the handle 105 in the following advantageous manner. The block 114 has a right-hand extension 120 of a yielding nature, and at the extremity of this projects a pin 121, which engages the inclined slot of a sliding cam 122 adapted to be moved fore and aft at will by means of a rod 123 extending from the cam slide to the handle 105. The handle 105 is adjustable to numerous positions, as seen in Fig. 13. Each position corresponds to a given speed adjustment, but the operator is relieved of the enormously heavy work necessary to change the position of the power transmitting parts.

The operation of the control devices may be substantially as follows. On throwing rearwardly handle 105, for example, to some intermediate position, the cam slide 122 is correspondingly shifted forwardly, thus throwing up the pin 121 and the extension 120, thereby slightly swinging the block 114 and rotating the shaft 113, at the same time swinging the block 112 and throwing the fiber wheel 109 into contact with the inner fly-wheel surface 107. This causes such rotation of the fiber wheel as to turn the screw 111 to shift the block 114 and rod 102 forwardly by power, and during such readjustment the speed ratio is gradually increased. At the same time the forward shifting of the block 114, carrying with it the pin 121, causes the latter to move down in the inclined slot of the cam plate 122. The described readjustment continues until the pin 121 arrives in its neutral, central or normal position, shown in Fig. 8. When in this position the parts 120, 114, 112 and 109 reassume their normal position, so that the fiber wheel 109 becomes inoperative and the adjustment ceases. Thus, every position of the hand lever 105 involves a corresponding position of the cam plate 122 and for each position thereof the speed varying parts automatically assume a corresponding position. Thus, the operator is afforded a handy, simple, efficient and easily operated controlling means whereby the power of the driving shaft is caused to effect the desired speed readjustment in full accordance with the will of the operator, as expressed by the hand lever movements. The full range of adjustment is effected by a comparatively short extent of lever throw, and therefore the device is quick-acting. When the handle has been thrown to a position corresponding with the desired speed, the adjustment to such speed is automatic. The mechanism involves no such guesswork as would be necessary if the operator was compelled to judge the proper adjustment and thereupon disengage the power adjusting connections.

It is frequently desirable to effect a very quick speed reduction in driving motor cars, whereas it is undesirable to make an abrupt speed increase. The arrangement of contacting the fiber wheel 109 with the outer fly-wheel surface 108 for speed decrease and the inner surface 107 for speed increase effects this result, because the inner surface is traveling at a much lower speed than the outer.

As before stated, this invention contemplates an automatic speed adjustment to accommodate the driving action to road conditions. If the mechanism could be constructed so the vehicle, passing from a level to an uphill or impeding stretch, could automatically have the speed ratio reduced, that would be an advantage and might dispense with a certain amount of attention from the operator. The present invention secures this result by taking advantage of the fact that, in driving uphill, the rear axle becomes displaced forward relatively to the vehicle body, the vehicle springs permitting a certain amount of play in a fore and aft direction. At the same time the structure does not interfere with, but permits, the full control of speed by the operator. The combined universal and slip joint at the forward end of the propeller shaft 26 allows the driving mechanism to accommodate itself to the relative shaft displacement. The forward displacement of the rear axle in climbing a hill depends upon the power exerted and upon the steepness of the hill. A reverse action of a similar nature takes place in going downhill where the rear wheels are braked, this serving to effect a rearward relative axle displacement.

The desired automatic adjustments are effected owing to the construction of the speed adjusting connections. The approximately upright arm 101, by which the fulcrum shaft 51 is turned, is connected at its upper end to the fulcrum shaft, which is part of the transmission mechanism, and its lower end is held by the rod 102 and connected parts against relative fore and aft displacement with respect to the frame, except at such times as at the will of the operator the connections are shifted for varying the speed. Therefore the fore and aft displacement of the rear axle, carrying the fulcrum shaft 51 with it, necessarily effects a turning of the fulcrum shaft. Referring to Figs. 8 and 1, the relative forward displacement of the rear axle in hill climbing effects a clockwise rotation of the shaft, thereby throwing down the speed adjusting lever 50. This in turn moves the pivot 49 to a lower point, so that the mean effective length of the intermediate lever 40 is shortened and the speed ratio thereby reduced, as desired.

It will thus be seen that there has been described a variable speed transmitter accomplishing the recited objects and advantages and other advantages will be apparent to those acquainted with the art. Since many matters of design, arrangement, detail, and other features may be indefinitely varied without departing from the invention herein involved, no limitation to such features is intended excepting as specified in the appended claims.

What is claimed is:

1. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, and means included in said mechanism for rendering approximately uniform the gripper speed through a substantial part of its travel.

2. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, and means included in said mechanism for rendering approximately uniform the gripper speed through a substantial part of its travel; said means comprising an oscillating lever intermediate of said eccentric and gripper, and a device for regularly changing the effective radius of said lever as the parts oscillate.

3. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, and means included in said mechanism for rendering approximately uniform the gripper speed through a substantial part of its travel; said means comprising an oscillating lever intermediate of said eccentric and gripper, a link between the lever and gripper and a device for regularly shifting the point of connection between lever and link as the parts oscillate.

4. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, and means included in said mechanism for rendering approximately uniform the gripper speed through a substantial part of its travel; said means comprising an oscillating lever intermediate of said eccentric and gripper, and a second lever for regularly changing the effective radius of said lever as the parts oscillate.

5. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, and means included in said mechanism for rendering approximately uniform the gripper speed through a substantial part of its travel; said means comprising an oscillating lever intermediate of said eccentric and gripper, a member, as roller 47, movable along said lever and connected with said gripper, and a device acting automatically as the parts oscillate for changing the position of said member in harmony with the eccentric's action for the purposes stated.

6. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, and means included in said mechanism for rendering approximately uniform the gripper speed through a substantial part of its travel; said means comprising an oscillating lever intermediate of said eccentric and gripper, a member, as roller 47, movable along said lever and connected with said gripper, and a device acting automatically as the parts oscillate for changing the position of said member in harmony with the eccentric's action for the purposes stated, said device comprising a second lever opposed to the first and having its free end connected to said member.

7. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, and means included in said mechanism for rendering approximately uniform the gripper speed through a substantial part of its travel; the parts constructed to permit adjustment for varying speed ratio while maintaining in each adjustment the stated uniformity of gripper velocity.

8. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, and means included in said mechanism for rendering approximately uniform the gripper speed through a substantial part of its travel; said means comprising an oscillating lever intermediate of said eccentric and gripper, and a device for regularly changing the effective radius of said lever as the parts oscillate, the same adjustable for altering the mean lever length to vary the speed ratio, and means for so adjusting it at suitable times.

9. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, and means included in said mechanism for rendering approximately uniform the gripper speed through a substantial part of its travel; said means comprising an oscillating lever intermediate of said eccentric and gripper, a link between the lever and gripper and a device for regularly shifting the point of connection between lever and link as the parts oscillate, the parts adjustable for altering at suitable times the mean lever length to vary the speed ratio.

10. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, and means included in said mechanism for rendering approximately uniform the gripper speed through a substantial part of its travel; said means comprising an oscillating lever intermediate of said eccentric and gripper, and a second lever for regularly changing the effective radius of said lever as the parts oscillate, said second lever being adjustable in location to vary the speed ratio, and means for so adjusting it at suitable times.

11. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, and means included in said mechanism for rendering approximately uniform the gripper speed through a substantial part of its travel; said means comprising an oscillating lever intermediate of said eccentric and gripper, a member, as roller 47, movable along said lever and connected with said gripper, and a device acting automatically as the parts oscillate for changing the position of said member in harmony with the eccentric's action for the purposes stated, said device comprising a second lever opposed to the first and having its free end connected to said member, and means for adjustably shifting the pivot of said second lever at suitable times for altering the speed ratio.

12. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, the same comprising adjusting means for varying the speed ratio, and a yielding cushion element so comprised in said mechanism as to yield the same extent at all speed ratio adjustments, said adjusting means and cushion element being distinct elements.

13. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, the same being adjustable to vary the speed ratio, means included in said mechanism for rendering approximately uniform the gripper speed through a substantial part of its travel and a yielding cushion element so comprised in said mechanism as to yield the same extent at all speed ratio adjustments.

14. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, the same being adjustable to vary the speed ratio, means included in said mechanism for rendering approximately uniform the gripper speed through a substantial part of its travel; said means comprising an oscillating lever intermediate of said eccentric and gripper, and a device for changing the effective radius of said lever as the parts oscillate and a cushion element comprised in said mechanism between said eccentric and lever adapted to yield the same extent at all speed ratio adjustments.

15. A variable speed transmitter including in combination, a driving shaft, a driven shaft, an eccentric actuated by the driving shaft, an intermittent gripper coöperating with the driven shaft for rotating it, mechanism between the shafts by which the eccentric vibrates the gripper, the same being adjustable to vary the speed ratio, means included in said mechanism for rendering approximately uniform the gripper speed through a substantial part of its travel; said means comprising an oscillating lever intermediate of said eccentric and gripper, and a device for changing the effective radius of said lever as the parts oscillate; said lever being rigid, and having a yielding arm connected with it, with which yielding arm the eccentric is connected for actuating the mechanism.

16. A variable speed transmitter including in combination, a driving shaft, a driven shaft, an intermittent gripper device cooperating with the driven shaft for rotating it, and mechanism by which the driving shaft vibrates the gripper device; said gripper device comprising a pawl, a vibrating pawl carrier mounted to oscillate concentrically with the driven shaft, a pawl controller connected to the pawl, and engageable with a concentric part on the driven shaft, whereby the pawl is only thrown into action when its speed exceeds that of the driven shaft.

17. A variable speed transmitter including in combination, a driving shaft, a driven shaft, a vibratory pawl system for either forward or reverse driving, connections from the driving shaft for effecting pawl vibration, a ratchet drum on the driven shaft having a forward drive section, a reverse drive section, and an inoperative section, and means for effecting relative axial adjustment as between said drum and pawl system, whereby to put into effect a forward or a reverse drive or to render the pawl system inoperative.

18. A variable speed transmitter including in combination, a driving shaft, a driven shaft, a vibratory pawl system containing one or more double acting pawls pivoted upon a suitable carrier for either forward or reverse driving, connections from the driving shaft for effecting pawl vibration, a ratchet drum on the driven shaft having a forward drive section, a reverse drive section, and between them an inoperative section, and means for effecting relative axial adjustment as between said drum and pawls, whereby to put into effect a forward or a reverse drive or to render the pawl system inoperative.

19. A variable speed transmitter including in combination, a driving shaft, a driven shaft, connections between the two adjustable for varying the speed ratio, a shiftable part, as arm 50, for adjusting said connections, and the following means for shifting said part to various adjustments: power connections for shifting said part in either of two directions, a control device, as cam 122, shiftable between different positions corresponding to the positions of said part, and means actuated by said device when the device and part are not in corresponding positions for applying said power connections to shift said part one way or the other into position corresponding with said device.

20. A variable speed transmitter including in combination, a driving shaft, a driven shaft, connections between the two adjustable for varying the speed ratio, a shiftable part, as arm 50, for adjusting said connections, and the following means for shifting said part to various adjustments: power connections for shifting said part in either of two directions, a shiftable control device, as cam 122, a member, as follower 121, cooperating with said device and also actuable by the adjustment of said part, said member adapted to apply power to move the part one way or the other until by such movement the member, controlled by said device, removes the power when the part has moved to a position corresponding with the position of the device.

21. A variable speed transmitter including combination, a driving shaft, a driven shaft, connections between the two adjustable for varying the speed ratio, a shiftable part, as arm 50, for adjusting said connections, and the following means for shifting said part to various adjustments: power connections for shifting said part in either of two directions, a controller comprising a pair of engaging members, as cam 122 and follower 121, having a central or normal adjustment, and adjustable from normal by the shifting at will of one of said members, as by sliding cam 122, connections from the other of said members for applying the power connections to shift said part, and connections for restoring the normal adjustment of the controller with the shifting of said part.

22. In combination, a part, as 50, to be adjusted to any of several positions, a source of power, as wheel 25, and the following means for causing the power adjustment of the part: power connections adapted to be rendered inoperative or operative for adjusting said part in either direction, a controller comprising a device, as 122, having different positions corresponding to the different positions of said part, and a member, as 121, adapted to render the power connections operative when the device is shifted, and connections whereby the shifting of the part to a position corresponding to the new position of the device restores the normal condition of the controller.

23. In a motor vehicle the combination of the frame, rear axle housing, resilient suspension between said frame and housing, manual control devices carried by the frame, a transmission and housing having rigid relation to the axle housing, and connection between said manual control devices and said transmission.

24. In a motor vehicle the combination of the frame, rear axle housing, resilient suspension between said frame and housing permitting relative fore-and-aft movement between housing and frame, a transmission carried with said housing, and horizontally extending control connections between said transmission and frame adapted to reduce the speed ratio upon forward movement of the axle relative to the frame and vice versa.

25. In a motor vehicle the combination of the frame, rear axle housing, resilient suspension between said frame and housing, manual control devices carried by the frame, a transmission and housing having rigid relation to the axle housing, and connection between said manual control devices and said transmission, said connections extending horizontally and so arranged that the speed ratio is increased or reduced by relative rearward or forward shifting of the axle.

26. In a motor vehicle the combination of the frame, rear axle housing, resilient suspension between said frame and housing, manual control devices carried by the frame, a transmission and housing having rigid relation to the axle housing, and connection between said manual control devices and said transmission, a motor carried by the frame, a high speed transmitting shaft between the motor and transmission, said transmission being of a kind effecting a speed reduction in driving said axle.

27. In a self-propelled vehicle the combination of a driving shaft and a driven shaft, a variable speed transmitter between said shafts, a manual control device for adjusting said transmitter to vary the speed of the driven shaft, and an automatic transmitter adjusting means operating in accordance with tractive conditions for varying the speed ratio, operable in all adjustments of said manual control device, and the latter operable in all adjustments of the former.

In testimony whereof, I have affixed my signature in presence of two witnesses.

JOHN REECE.

Witnesses:
   FRANCIS A. SHEA,
   DONALD CAMPBELL.

Copies of this patent may be obtained for five cents each, by addressing the "Commissioner of Patents, Washington, D. C."